June 24, 1930.  M. C. CARBONARO  1,768,031
AUTOMATIC RECORDING LIQUID METER
Original Filed March 6, 1923  5 Sheets-Sheet 2

Inventor
Marino C. Carbonaro
By Sturtevant & Mason
Attorneys

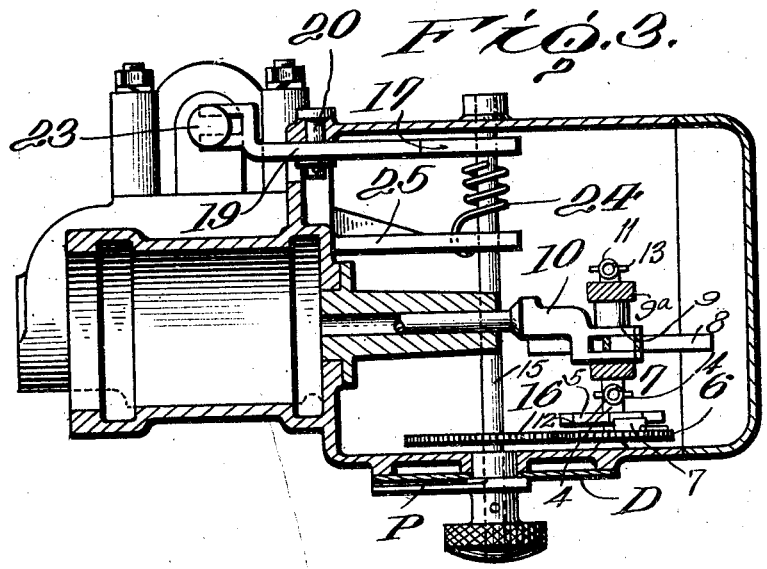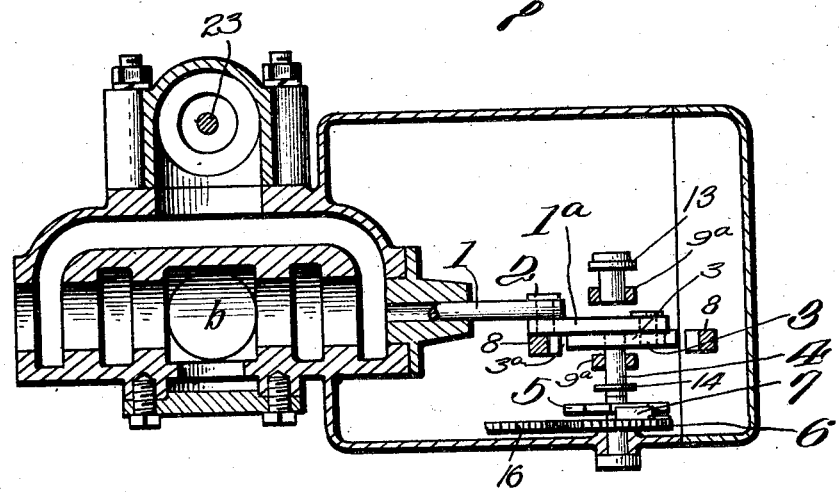

June 24, 1930.  M. C. CARBONARO  1,768,031
AUTOMATIC RECORDING LIQUID METER
Original Filed March 6, 1923  5 Sheets-Sheet 4

Inventor
Marius C. Carbonaro
By Sturtevant & Mason
Attorneys

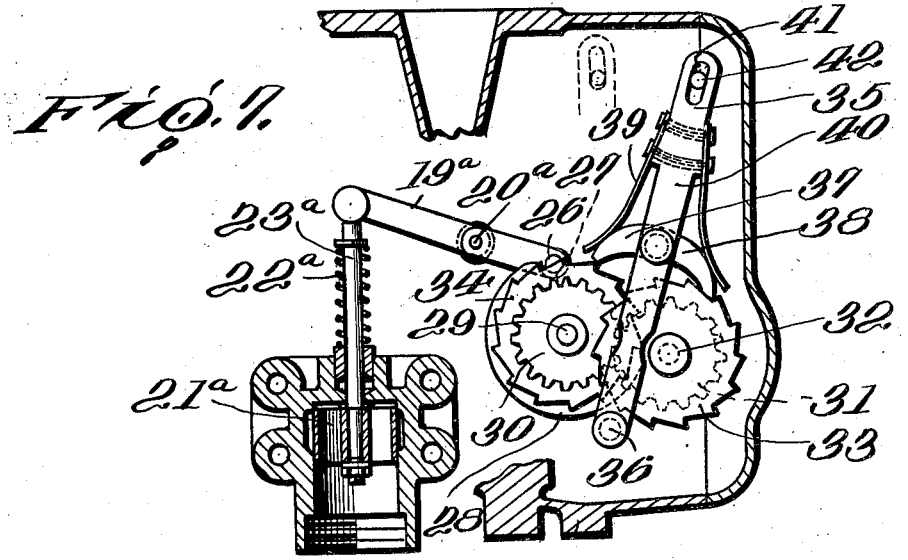
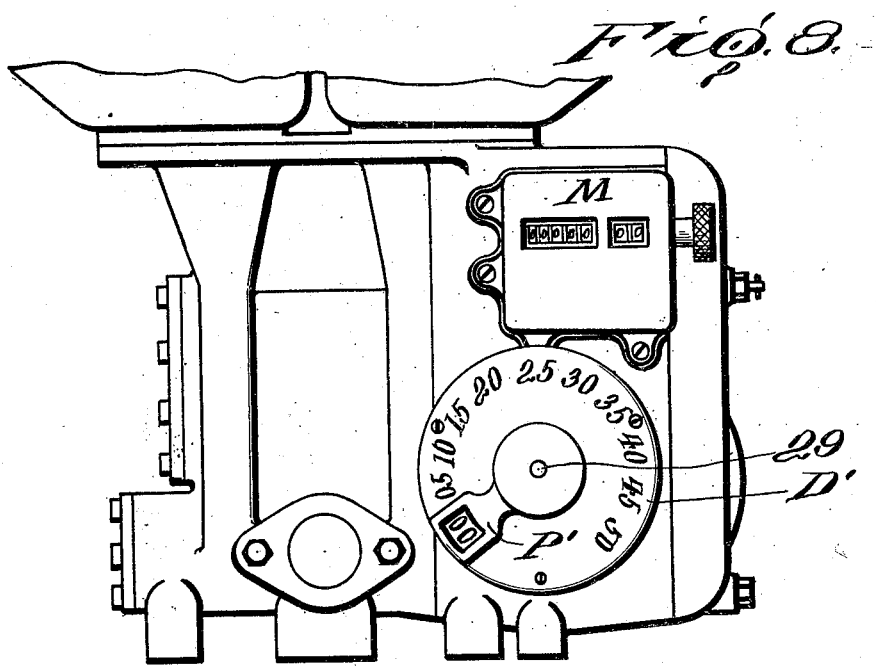

Patented June 24, 1930

1,768,031

UNITED STATES PATENT OFFICE

MARIUS C. CARBONARO, OF PARIS, FRANCE, ASSIGNOR TO SOCIETE HARDOLL ANCIENS ESTABLISSEMENTS HARIVEAU & DOLIVIER ET RENE PORTE & CIE. REUNIS, OF LEVALLOIS-PERRET, FRANCE

AUTOMATIC RECORDING LIQUID METER

Original application filed March 6, 1923, Serial No. 623,140, and in France March 10, 1922. Divided and this application filed February 6, 1926. Serial No. 86,580.

The invention relates to new and useful improvements in automatic recording meters for all kinds of liquids. In my application Serial No. 623,140, filed March 6, 1923, of which this application is a division, I have shown and described an automatic meter for liquids wherein the liquid to be metered is delivered in invariable measured quantities. This is accomplished by a measuring device including two measuring chambers of given capacity, and a reversing valve mechanism for controlling the flow of liquid alternately to and from said chambers, and also by means normally inactive for shifting the valves, and means controlled by the pressure on the liquid in the measuring chambers for initiating the movement of the valves by said actuating means.

An object of the present invention is to provide a measuring device of the above type with means for automatically shutting off the supply of liquid when a predetermined quantity of liquid determined by the operations of the measuring chambers has been supplied.

A further object of the invention is to provide a recording device for indicating the partial quantities delivered at each operation as well as the total quantity supplied from the time of setting the measuring device into action, which indicating means operates automatically to cut off the supply after the desired quantity has been delivered.

In the drawings—

Figure 2:
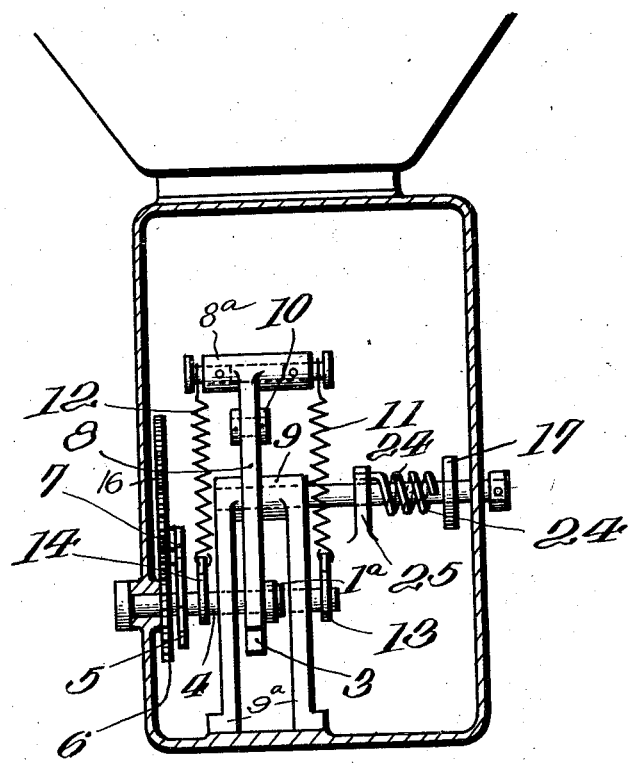
Fig. 2 is a sectional view on the line 2—2 of Fig. 1.
Figure 2A:
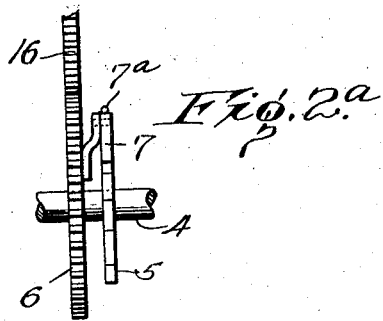

Fig. 2ª is a detail view on a larger scale than Fig. 2, showing the relationship of the gears, ratchet and pawl.

Figure 1:
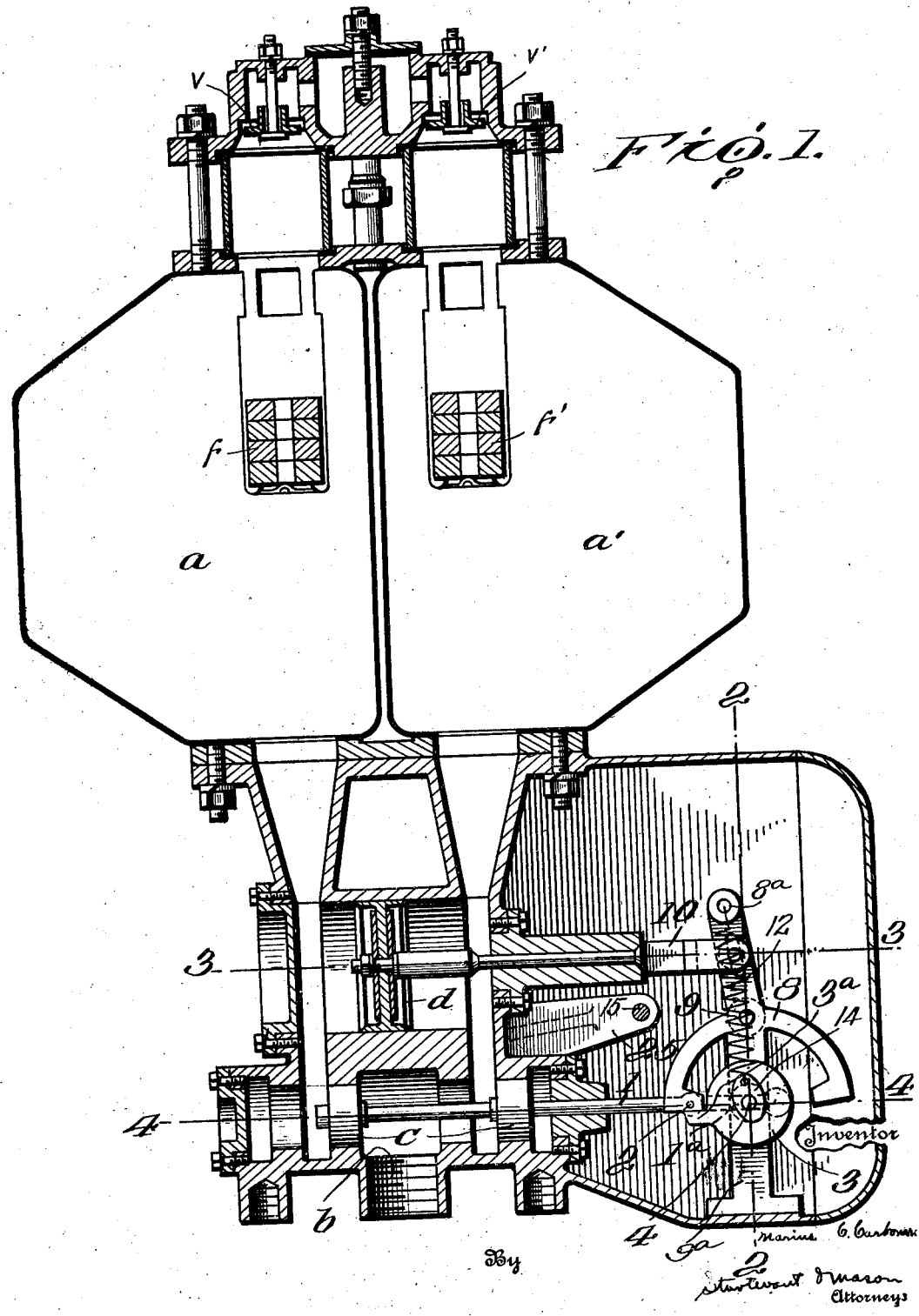
Figure 1 is a vertical sectional view through the measuring and recording device embodying the invention with the inlet valve elements omitted for clearness.
Figure 5:
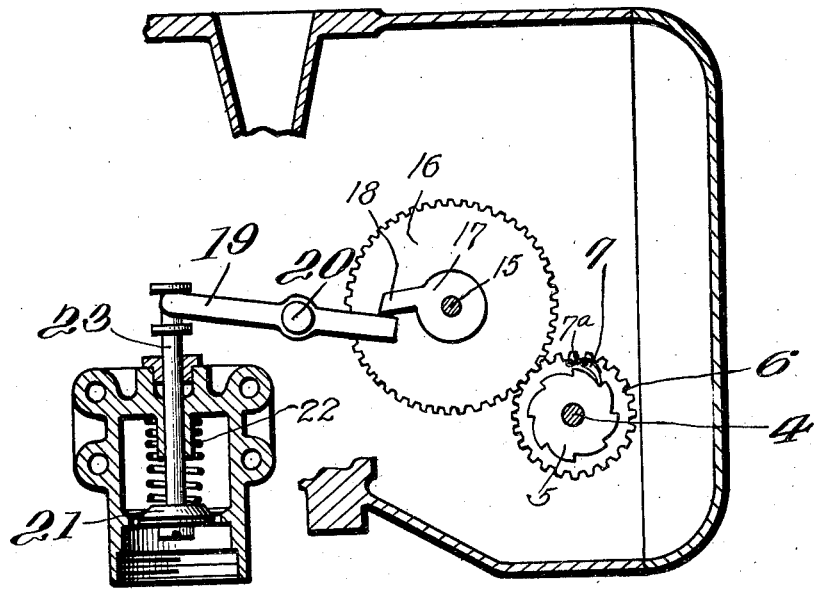
Figure 6:
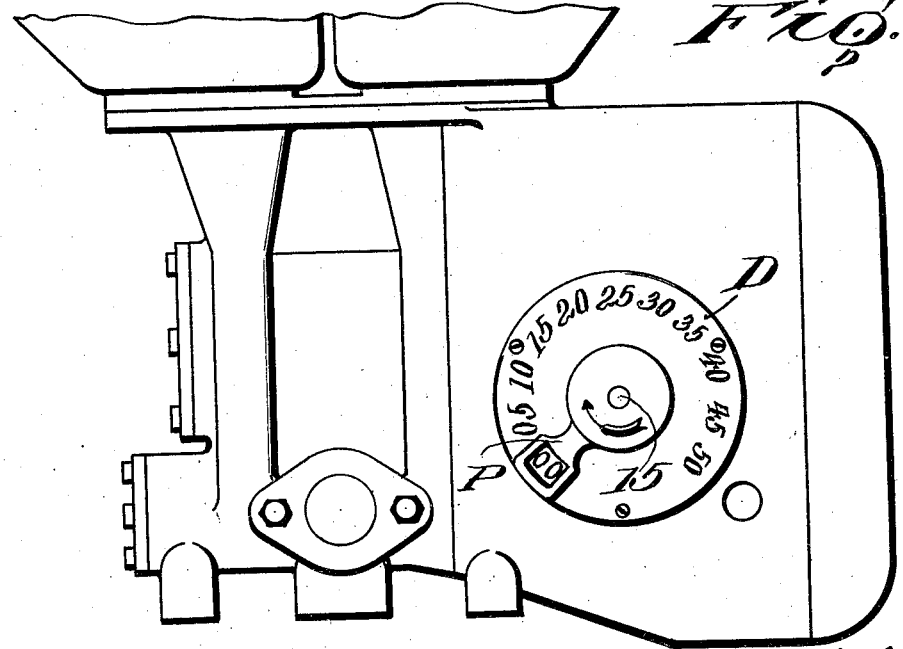

Fig. 3 is a sectional view on the line 3—3 of Fig. 1;

Fig. 4 is a sectional view on the line 4—4 of Fig. 1;

Fig. 5 is a view partly in section showing in elevation a portion of the indicating mechanism and the means controlled thereby for automatically cutting off the supply, certain of the parts of the indicating mechanism being omitted for the sake of clearness and certain connecting gears and associated parts being shown in dotted lines to indicate the relationship of the members;

Fig. 6 is a view in front elevation showing a portion of the measuring device;

Fig. 7 is a view partly in section showing a modified form of means for controlling the supply valve by the registering indicating means, and Fig. 8 is a front view of a portion of the measuring means embodying the invention of Fig. 7.

In my parent application of which this is a division, I have shown and described in detail a measuring mechanism for liquids wherein there are two independent measuring chambers of given capacity. There is a feed pipe for delivering liquid to said chambers and an exhaust pipe for dispensing the liquid. These two pipes are common to both chambers, and between the pipes and chambers is a reversing valve mechanism for controlling the flow of the liquid through said pipes. In the parent case, the valves are shifted by means of a spring, and the actuating mechanism for the valves includes devices whereby the piston subject to the pressure of the liquid being measured, is operated when the chamber is completely filled for initiating the action of the spring mechanism which shifts the valves. There is also shown and described in the parent application, the arrangement whereby the valves are shifted by a spring in which power is stored by the setting of the indicator to the amount of liquid to be delivered and the action of this spring is controlled by an escapement lever. In Figures 1 to 6 of the present case, I have shown this form of valve actuating mechanism, and the invention embodying the indicator wherein the spring is used for this purpose will now be described. In this form of the invention there are two measuring chambers indicated at $a$ and $a'$, and an exhaust pipe is indicated at $b$. The reversing valves are indicated at $c$. A piston $d$ controlled by the pressure on the liquid supplied to the measuring chambers when a measuring chamber is completely filled operates an escapement lever which permits a spring to shift the valves c, c. The present invention is directed particularly to the means for automatically closing the valve which controls the supply of liquid to the measuring chamber. The present invention is likewise directed to means for indicating or recording the partial quantities delivered at each operation, as well as the total quantity supplied, and up to the time when the valve is automatically closed for cutting off the supply.

According to the invention as shown in Figures 1 to 6, inclusive, the reversing valves c carry a rod 1. This rod at its outer end 2 is pivotally connected to a plate 3 by means of a link 1ª, and the plate is rigidly connected to a shaft 4 on which a ratchet wheel 5 is keyed. The toothed wheel 6 is loosely mounted on this shaft 4 and carries on its lateral face at the side adjacent the ratchet wheel 5, a pawl 7 with a spring 7ª which cooperates with the ratchet wheel 5. The plate 3 has on its periphery, a tooth or lug 3ª subject to the action of an escapement 8 rocking on a fixed pin 9 of the supporting stirrup 9ª under the action of the piston d which actuates the escapement lever 8 through a connection 10. The escapement lever is maintained in inclined position by the action of springs 11 and 12 extending between the upper end 8ª of the escapement lever 8 and fixed abutments 13 and 14 pivoted on the support 9ª and on shaft 4, respectively.

A shaft 15 is connected with a registering pointer P cooperating with a numbered dial D. Mounted on the shaft 15 is a toothed wheel 16 which is keyed to said shaft 15. This toothed wheel 16 meshes with the toothed wheel 6. Also mounted on the shaft 15 is a disk 17 carrying a projecting lug or finger 18 which is adapted to cooperate with a lever 19 fulcrumed at 20 on the frame of the machine. The right-hand end of the lever 19 lies in the path of the lug or finger 18 as shown in Fig. 5, in which position the supply is cut off from the measuring device. This is accomplished through a stop valve 21 interposed in the feed pipe, which valve is normally opened by a spring 22. When the right-hand end of the lever 19 is depressed through the rotation of the shaft 15 carrying the finger 18 into engagement therewith, then the valve stem 23 carrying the valve 21 is raised and closes the valve. The shaft 15 is rotated by a torsion spring 24, one end of which is attached to the shaft and the other end to a fixed bracket or abutment 25 formed on the frame of the apparatus or measuring device. The tension of this spring is sufficient so as to cause the shaft 15 to rotate in a counter clockwise direction which will move the finger or lug 18 into engagement with the end of the lever 19 thus lifting the valve against the tension of the spring 22 and closing said valve. The dial D is graduated from 0 to 50 liters. When the pointer P is at 0, then the finger or lug 18 bears on the lever 19 so that the valve is pressed on its seat and the supply is cut off from the measuring chamber. Assuming that it is desired to draw off 35 litres, the pointer P is turned in the direction of the hands of a watch so that its index marks 35 litres. The effect of this rotation is to increase the tension on the spring 24. Furthermore, the rotation of the shaft 15 incident to the setting of the pointer at 35 litres will move the finger or lug 18 away from the end of the lever 19 and thus permit the spring 22 to open the valve. This valve being open, liquid will flow into the left-hand measuring compartment a when the parts are in the position shown in Fig. 1. This rotation of the pointer P produces an equal clockwise rotation of the toothed wheel 16 and consequently a counterclockwise movement of the toothed wheel 6. During the rotation of the toothed wheel 6, a pawl 7 slips or rides freely over the ratchet wheel 5, and consequently the shaft 4 remains stationary.

As soon as the left-hand measuring chamber a is filled, the float f rises into contact with and closes the valve v, so that a superpressure is produced in this chamber which operates upon the piston d and moves the same toward the right. This movement of the piston will shift the escapement lever 8 so as to release the lug 3ª.

It will be noted that the tension of the spring 24 is tending to rotate the shaft 15 in a counter clockwise direction, and gear 6 and ratchet 5 and hence shaft 4 in a clockwise direction but these rotations are restrained by the escapement lever 8. When the pointer is set at 35 litres, the shaft 15 is turned in a clockwise direction, the tension corresponding to the movement of the pointer over the dial. The toothed wheel 6 is rotated in a counter clockwise direction, the pawl riding over the ratchet wheel 5 and therefore, no movement is imparted to the shaft 4. When the escapement lever is swung from one side of a vertical line to the other, then the disk 3 is released for a half rotation, and this rotation is caused by the stored power in the spring 24. This is accomplished by the rotating of the shaft 15 in a counter clockwise direction which imparts rotation to the toothed wheel 6 in a clockwise direction, and through the pawl 7 and ratchet wheel 5 imparts rotation to the shaft 4 in a clockwise direction. As this shaft 4 rotates through the link 1ª, it will move the valve c. During the rotation of the shaft 4 through 180 degrees, that is, from one engagement of the escapement lever to the next engagement therewith, the valves C, C will be shifted from their extreme right-hand position to the extreme left-hand position as viewed in Fig. 1.

During the delivery of liquid through the valve 21 into the measuring chamber $a$, any liquid present in the measuring chamber $a'$ has been delivered through the discharge $b$, and the air in the upper part of chamber $a$ has passed through the valve $v$, which has remained open, and across the top of the device and downward through the valve $v'$ which opens immediately upon the delivery of liquid from the measuring chamber $a$, thereby venting this air from the chamber $a$ and preventing an air-lock. Obviously, other means of venting the air may be employed. As soon as the valve $v$ has been closed and the superpressure in chamber $a$ has caused the piston $d$ to move to the right and hence move the escapement lever 8 until the valves $c, c$ are reversed, the supply of liquid to chamber $a$ is cut off and this supply is diverted into the chamber $a'$. Simultaneously, the discharge is connected to the chamber $a$, so that liquid in such chamber flows outward and downward through the discharge $b$. The liquid entering the measuring chamber $a'$ eventually raises the float $f'$ into contact with and closes the valve $v$, thereby preventing the further escape of air or liquid from this chamber and causing a superpressure therein which causes the piston $d$ to move to the left, producing another reversal of position of the valves $c, c$.

The shaft 15 during this actuation of the valve $c$ by the spring 24 will only turn through a small arc of motion before the escapement lever stops the shaft 4, and through the toothed wheels 5 and 6 stops the shaft 15. In other words, after one setting of the valve $c$, one chamber is emptied and the pointer passes over the dial from 35 to 30. During the emptying of the other chamber, it passes from 30 to 25, and so on until it finally reaches 0. When it reaches 0, then the shaft 15 reaches the position where the lug 18 will engage the lever 19 and through this lever 19 close the valve 21 and stop any further dispensing of liquid. I have, therefore, provided a measuring device wherein the liquid dispensed is delivered in invariable increments or quantities, and each increment or quantity delivered registered, and after a certain predetermined quantity has been delivered, the measuring device is automatically stopped.

In the above described embodiment of the invention, the valve is shifted by the spring in the registering mechanism which is put under additional compression by the setting of the pointer at the amount to be delivered.

The valves are operated in the parent case by a spring in which power is stored, and this actuating mechanism for the valve which is entirely independent of the registering mechanism is initiated by a movement of the piston $d$. In Figures 7 and 8 I have shown a mechanism more particularly adapted for use in conjunction with the valve operating mechanism of the parent case, of which this is a division. In this form of the invention, the valve $21^a$ which controls the supply of liquid to the measuring chambers is held closed by means of a spring $22^a$. The lever $19^a$ pivoted at $20^a$ is adapted to bear on the end of the valve stem $23^a$ which carries the valve $21^a$. This lever is provided with a roller 26 which is adapted to drop into a groove indicated in dotted lines at 27 in Fig. 7. This groove is formed in a disk 28 mounted on a shaft 29. Fixed to this shaft 29 is a toothed wheel 30 which meshes with a toothed wheel 31 shown in dotted lines at the right of Fig. 7. The toothed wheel 31 is mounted on a shaft 32. On this shaft is a ratchet wheel 33 and on the shaft 29 is a ratchet wheel 34. A lever 35 is pivoted at 36 and is provided with pawls 37 and 38. These pawls are held in engagement with the respective ratchet wheels 33 and 34 by means of leaf springs 39 and 40. The upper end of the lever 35 is provided with a slot 41. On the end of the rod 10 connected with the piston $d$ is a pin 42 which engages in said slot 41.

If, again 35 litres is desired, the pointer P' is turned across the face of the dial D' in a counter clockwise direction around to 35. This pointer P' is mounted on the shaft 29 and the rotation of the shaft 29 will rotate the disk 28 and cause the roller 26 to move out on to the periphery of the disk, and this will swing the lever $19^a$ and open the valve. Thus turning of the disk 28 in a counter clockwise direction is permitted, as the pawl 37 will merely slide over the ratchet wheel 34, and the shaft 32, which is at this time turned in a clockwise direction, is permitted by reason of the fact that the pawl 38 will ride over the ratchet wheel 33. The parts are now set for the delivering of 35 litres of liquid. The valve is open so that the liquid passes into one or the other of the measuring chambers. When the chamber is filled, then the pressure on the liquid at the end of the filling of the chamber will move the piston $d$ one way or the other depending upon which chamber is being filled. As viewed in Fig. 1, the device is set for the filling of chamber $a$, and when this is filled, the piston $d$ will be moved to the right. When the chamber $a'$ is filled, then the piston is moved to the left. The parts shown in Fig. 7 are set so that when the piston $d$ is moved to the left, the lever 35 will be moved to the dotted line position. This will cause the pawl 37 to turn the ratchet wheel 34 one step, and this step movement of the ratchet wheel 34 will move the pointer from 35 litres to 30 litres, indicating that 5 litres have been measured and are being discharged. When the chamber $a'$ is filled, then the piston moves to the right as viewed in Fig. 1, and this will move the lever 35 back again to the full line position. During this movement of the lever, the pawl 38 will turn the ratchet wheel 33 one step, and through the toothed wheel moving therewith, it will rotate the toothed wheel 30, and the shaft 29 so as to again move the pointer from the registering mark 30 to the registering mark 25. This continues until the full amount desired has been measured in invariable increments or quantities, each of which has been indicated, and when the zero mark is reached, it indicates that the desired quantity has been dispensed. At this time the disk 28 has reached the point so that the roller 26 drops into the recess 27 and permits the valve 21$^a$ to close through the action of the spring 22$^a$ thereon. This automatically stops the dispensing device.

In Fig. 8 of the drawing there is shown an independent meter M which is provided for registering the total number of times the measuring chambers have been filled. This meter registers from zero to 9,999 litres. It also has a partial meter register from 0 to 99, with a side operating button for setting the partial registering meter back to zero. This meter can be controlled in any suitable manner by the movement of the rod which is attached to the piston $d$.

It is obvious that minor changes in the details of construction can be made without departing from the spirit of the invention as set forth in the appended claims.

Having thus described the invention, what I claim as new and desire to secure by Letters Patent, is:—

1. In a meter apparatus for measuring liquids, the combination of two measuring chambers of given capacity, devices for air venting each chamber, a supply valve for controlling the supply of liquid to said measuring chambers, automatically operating valve mechanism actuated by the pressure developing on the liquid for controlling the supply to said chambers so that one chamber is filled while the other is being discharged, and means operatively associated with said valve mechanism whereby the supply valve is automatically closed when the desired quantity has been measured.

2. In a meter apparatus for measuring liquids, the combination of two measuring chambers of given capacity, devices for air venting each chamber, a supply valve for controlling the supply of liquid to said measuring chambers, automatically operating valve mechanism actuated by the pressure developing on the liquid for controlling the supply to said chambers, an indicating device including a dial and a pointer adapted to be set to indicate the quantity of liquid desired to be measured, means for turning the pointer step by step toward zero as the liquid in each chamber is measured, and means operatively associated with said indicating device whereby the supply valve is automatically closed when the desired quantity has been measured.

3. In a meter apparatus for measuring liquids, the combination of two measuring chambers of given capacity, devices for air venting each chamber, a supply valve for controlling the supply of liquid to said measuring chambers, automatically operating valve mechanism actuated by the pressure developing on the liquid for controlling the supply to said chambers, an indicating device including a dial and a pointer, ratchet wheels geared together, oscillating pawls arranged so that when said valve mechanism is shifted in one direction, the pointer is turned one step, and when the valve mechanism is shifted in another direction, the pointer is turned another step, and means associated with said indicating mechanism whereby the supply valve is automatically closed when the pointer reaches a predetermined point and the desired quantity has been measured.

4. In a meter apparatus for measuring liquids, the combination of two measuring chambers of given capacity, a supply valve for controlling the supply of liquid to said measuring chambers, a shiftable valve mechanism whereby one chamber is filled while the other is being discharged, an indicating mechanism including a dial and a pointer, means for turning said pointer including ratchet wheels geared together and to said pointer, said ratchet wheels having their teeth facing in opposite directions, an oscillating lever, pawls carried thereby and adapted to cooperate with the respective ratchet wheels, means for connecting said lever to said shiftable valve mechanism whereby when said valve mechanism is shifted in one direction, one ratchet wheel is operated to turn the pointer, and when said valve is shifted in the other direction, the other ratchet wheel is operated to turn the pointer, a cam disk movable with said ratchet wheels and having a recess formed in the periphery thereof, a lever connected to said supply valve and adapted to bear on said cam disk, said ratchet wheels permitting said pointer to be turned so as to be set at a desired quantity to be delivered, and simultaneously opening the supply valve to permit the liquid to be supplied to the measuring chambers, said reciprocating lever operating to turn said ratchet wheels step by step as the valve is shifted, and turn the pointer step by step toward zero, and said disk operating when the pointer reaches zero to automatically close the supply valve.

In testimony whereof I have signed my name to this specification.

MARIUS C. CARBONARO.